United States Patent
Seo et al.

(10) Patent No.: US 10,710,634 B2
(45) Date of Patent: Jul. 14, 2020

(54) ACTIVE GEOMETRY CONTROL SUSPENSION

(71) Applicants: Hyundai Motor Company, Seoul (KR); Kia Motors Corporation, Seoul (KR)

(72) Inventors: In Seok Seo, Seoul (KR); Jae il Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 101 days.

(21) Appl. No.: 16/212,882

(22) Filed: Dec. 7, 2018

(65) Prior Publication Data
US 2019/0367094 A1 Dec. 5, 2019

(30) Foreign Application Priority Data
Jun. 5, 2018 (KR) .......................... 10-2018-0065014

(51) Int. Cl.
*B62D 17/00* (2006.01)
*B60G 7/00* (2006.01)

(52) U.S. Cl.
CPC ............. *B62D 17/00* (2013.01); *B60G 7/003* (2013.01); *B60G 2206/10* (2013.01)

(58) Field of Classification Search
CPC ................................ B62D 17/00; B60G 7/003
See application file for complete search history.

(56) References Cited

U.S. PATENT DOCUMENTS

| | | | | |
|---|---|---|---|---|
| 5,098,116 A | * | 3/1992 | Edahiro ................. | B60G 3/205 280/124.144 |
| 5,351,985 A | * | 10/1994 | Ando ....................... | B60G 3/20 280/5.51 |
| 5,431,429 A | * | 7/1995 | Lee .......................... | B60G 3/20 280/124.139 |
| 5,451,073 A | * | 9/1995 | Inoue ...................... | B60G 3/26 280/124.145 |
| 5,700,025 A | * | 12/1997 | Lee ........................ | B60G 3/265 280/124.135 |
| 6,676,145 B2 | * | 1/2004 | Carlstedt ................ | B60G 3/265 280/124.146 |
| 6,688,620 B2 | * | 2/2004 | Serra ...................... | B60G 3/265 280/124.135 |

(Continued)

FOREIGN PATENT DOCUMENTS

| | | | | |
|---|---|---|---|---|
| DE | | 3740395 A1 * | 6/1988 | ............. B60G 3/202 |
| DE | | 3929390 A1 * | 3/1991 | ............... B60G 3/26 |

(Continued)

*Primary Examiner* — Nicole T Verley
(74) *Attorney, Agent, or Firm* — Morgan, Lewis & Bockius LLP

(57) ABSTRACT

An active geometry control suspension may include a first link having one side connected to a wheel carrier engaged to a wheel and the other side extending along a width direction of a vehicle; a second link having one side connected to the wheel carrier and the other side extending in the width direction of the vehicle; a first lever having one side connected to the other side of the first link; a second lever having one side connected to the other side of the second link; a connection lever connecting the other side of the first lever and the other side of the second lever; and an actuator connected to the connection lever.

17 Claims, 10 Drawing Sheets

(56) References Cited

U.S. PATENT DOCUMENTS

| | | | | |
|---|---|---|---|---|
| 6,962,356 B2 * | 11/2005 | Kwon | ............... | B60G 7/003 |
| | | | | 280/5.522 |
| 7,793,946 B2 * | 9/2010 | Vaxelaire | ............... | B60G 3/26 |
| | | | | 280/5.521 |
| 7,878,511 B2 * | 2/2011 | Haeusler | ............... | B60G 3/18 |
| | | | | 280/124.136 |
| 2010/0117313 A1 * | 5/2010 | Choi | ............... | B60G 7/003 |
| | | | | 280/5.523 |
| 2011/0042907 A1 * | 2/2011 | Lee | ............... | B60G 17/0152 |
| | | | | 280/5.522 |

FOREIGN PATENT DOCUMENTS

| | | | | |
|---|---|---|---|---|
| DE | 102004008802 A1 * | 9/2005 | ............ | B60G 3/202 |
| DE | 102012019870 A1 * | 4/2014 | ............ | B60G 7/006 |
| EP | 0278095 A1 * | 8/1988 | ............ | B60G 7/006 |
| EP | 0506141 A1 * | 9/1992 | ............ | B60G 3/26 |
| FR | 2872452 A1 * | 1/2006 | | |
| KR | 10-1090804 B1 | 12/2011 | | |
| WO | WO-2008040285 A1 * | 4/2008 | ............ | B60G 3/20 |
| WO | WO-2008142112 A1 * | 11/2008 | ............ | B60G 7/008 |

* cited by examiner

ACTIVE GEOMETRY CONTROL SUSPENSION

CROSS-REFERENCE TO RELATED APPLICATION

The present application claims priority to Korean Patent Application No. 10-2018-0065014 filed on Jun. 5, 2018, the entire contents of which is incorporated herein for all purposes by this reference.

BACKGROUND OF THE INVENTION

Field of the Invention

The present invention relates to an active geometry control suspension. More particularly, the present invention relates to an active geometry control suspension capable of simultaneously controlling two geometries by one actuator.

Description of Related Art

In general, an active geometry control suspension (AGCS) optionally adjust geometry between a wheel and a suspension, and is referred to as an apparatus that improves driving stability of a vehicle.

The active geometry control suspension may include an assist link having one side connected to a wheel, a control lever connected to the other side of the assist link, an actuator controlling the operation of the control lever, and a controller determining a running state of the vehicle to control the driving of the actuator.

Accordingly, the controller during the running of the vehicle determines the running state of the vehicle through several sensors and controls the operation of the actuator to control a toe value and a camber value of the wheel if necessary through the control lever, stabilizing the running state of the vehicle.

However, to control the toe or the camber angle of the wheel, since the conventional active geometry control suspension is formed of a structure controlling one actuator per geometry, the actuator to control the toe of the wheel and the actuator to control the camber angle are separately provided, and as the geometry is controlled through each actuator, there is a problem that a weight and a cost of the active geometry control suspension increase.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an active geometry control suspension configured for simultaneously controlling two geometries by only one actuator, reducing a weight and a cost.

An active geometry control suspension may include a first link having one side connected to a wheel carrier engaged to a wheel and the other side extending along a width direction of a vehicle; a second link having one side connected to the wheel carrier and the other side extending in the width direction of the vehicle; a first lever having one side connected to the other side of the first link; a second lever having one side connected to the other side of the second link; a connection lever connecting the other side of the first lever and the other side of the second lever; and an actuator connected to the connection lever.

The first link may be connected to an upper portion of the wheel carrier.

The first lever may adjust camber of the wheel.

The second lever may adjust toe of the wheel.

The active geometry control suspension may further include a third link having one side connected to the wheel carrier and the other side extending in the width direction of the vehicle and mounted with a suspension spring.

The actuator may include a motor and a screw moving back and forth by the motor, and the screw may be connected to the connection lever.

The second lever may include a third lever having one side connected to the connection lever, and a fourth lever having one side connected to the second link.

The other side of the first lever and the other side of the second lever may be connected to form an obtuse angle, forming a connection portion, and the connection portion may form a hinge portion of the third and fourth levers.

The first lever may include a fifth lever having one side connected to the connection lever, and a sixth lever having one side connected to the first link.

The other side of the fifth lever and the other side of the sixth lever may be connected to form an obtuse angle, forming a connection portion, and the connection portion may form a hinge portion of the fifth and sixth levers.

The length of the first link may be formed to be longer than the length of the second link, and the length of the sixth lever may be formed to be shorter than the length of the fourth lever.

One side of the connection lever may be connected to the actuator, and the other side of the connection lever may be disposed to extend in the width direction of the vehicle.

Lengths of the third lever and the fifth lever may be the same.

The connection lever and the actuator may be connected by a joint.

According to the active geometry control suspension according to an exemplary embodiment of the present invention, as the toe of the wheel and the camber angle are simultaneously controlled by only one actuator, the running stability of the vehicle may be improved, and a reduction of the weight and cost may be obtained.

Also, the initial toe and camber angle of the wheel may be easily controlled, and a setting of the toe and the camber angle may be easy through the lever ratio.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
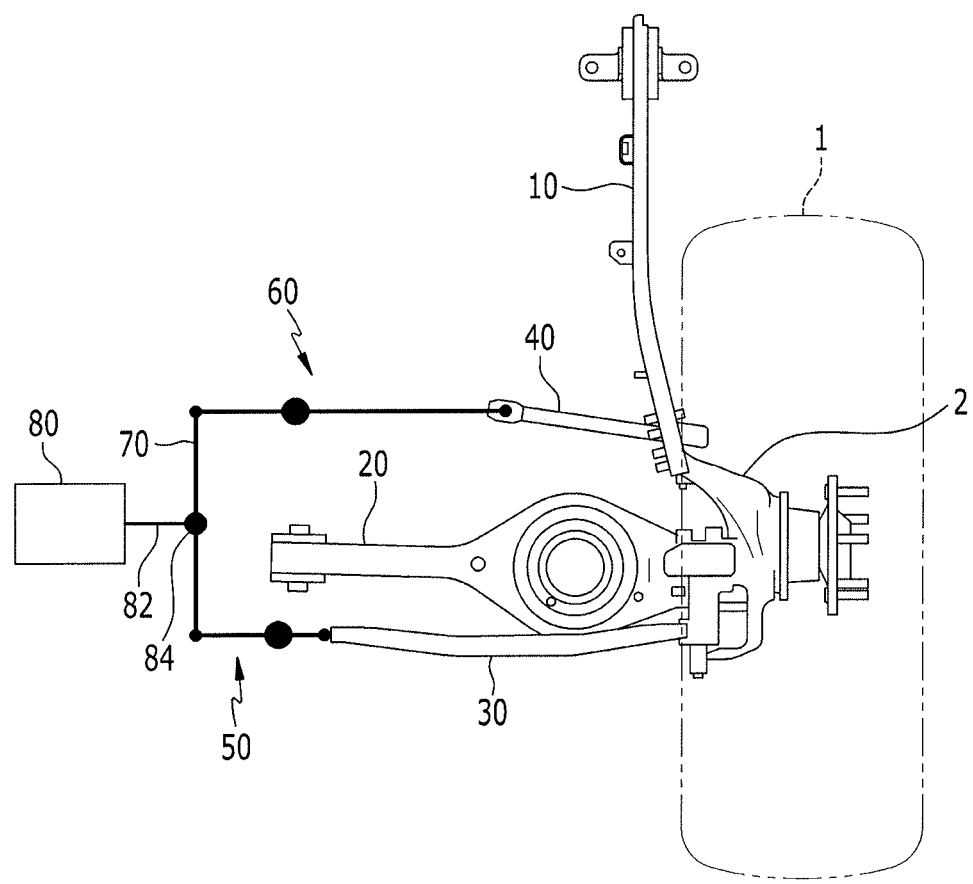
FIG. 1 is a top plan view of an active geometry control suspension according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, an exemplary embodiment of the present invention will be described in detail with reference to the accompanying drawings.

Figure 2:
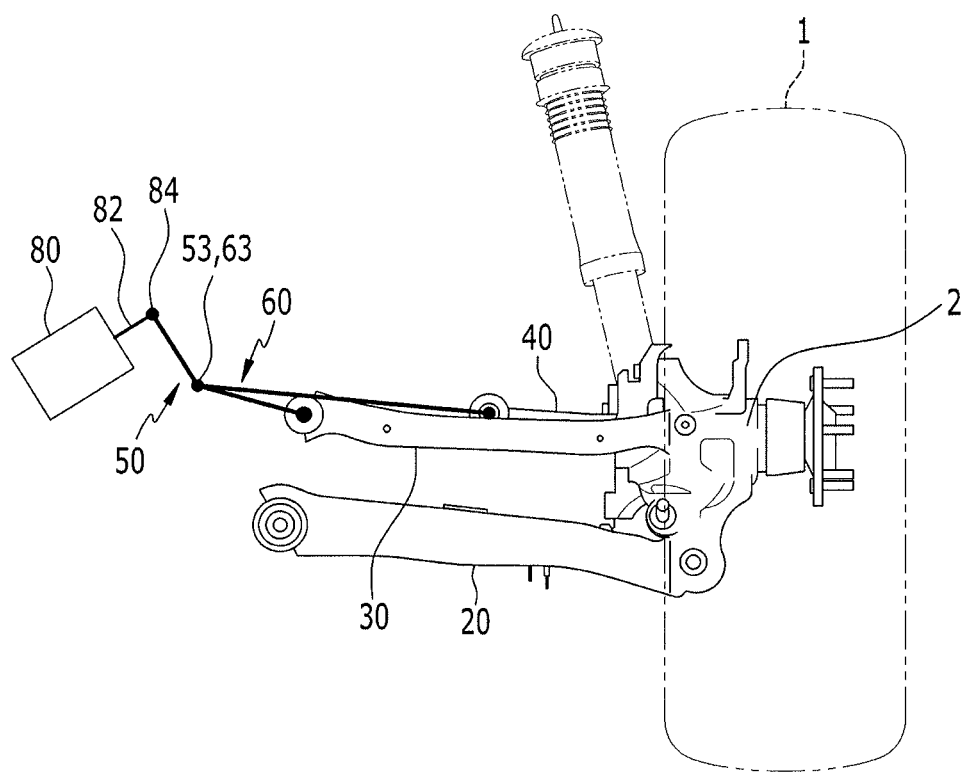
FIG. 2 is a front view of FIG. 1.

Referring to FIG. 1 and FIG. 2, an active geometry control suspension according to an exemplary embodiment of the present invention may be applied to a multilink type of suspension.

The multilink type of suspension may include a trailing link 10 having one side connected to a wheel carrier 2 engaged to a wheel 1 and the other side extending along a longitudinal direction of the vehicle as a fourth link, a lower link 20 having one side connected to the wheel carrier 2 and the other side extending in a width direction of the vehicle and mounted with a suspension spring as a third link, an upper link 30 disposed at a position which is relatively higher than the lower link 20 and having the other side extending in the width direction of the vehicle as a first link, and an assist link 40 having one side connected to the wheel carrier 2 and the other side extending in the width direction of the vehicle as a second link.

The active geometry control suspension according to an exemplary embodiment of the present invention may include a camber control lever 50 having one side connected to the other side of the upper link 30 of the multilink type of suspension as a first lever controlling the camber of the wheel, and a toe control lever 60 having one side connected to the other side of the assist link 40 as a second lever controlling the toe of the wheel.

The active geometry control suspension according to an exemplary embodiment of the present invention may further include a connection lever 70 integrally connecting the other side of the camber control lever 50 and the other side of the toe control lever 60, and an actuator 80 connected to the connection lever 70 to provide an operation force to the connection lever 70.

The actuator 80 may include a motor and a screw 82 moving back and force by the motor, and the screw 82 may be connected to the connection lever 70.

Figure 3:
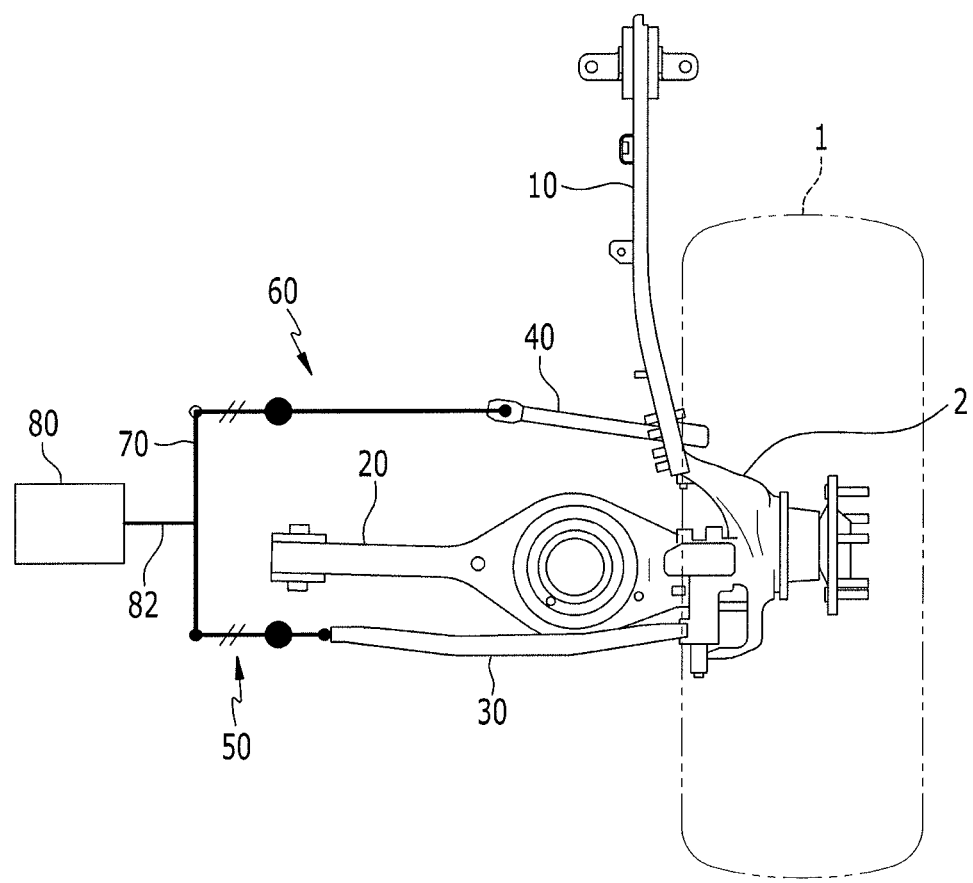
FIG. 3 is a top plan view of an active geometry control suspension according to various exemplary embodiments of the present invention.

The screw 82 and the connection lever 70 of the actuator 80 may be connected through a joint 84, as shown in FIG. 3, or may have the same length as a third lever and a fifth lever described later.

Also, the actuator 80 may be connected to an output terminal of the controller for the operation thereof to be controlled by the control signal of the controller, and the controller may detect and determine the running state of the vehicle through various sensors to apply an appropriate control signal to the actuator 80.

Figure 4:
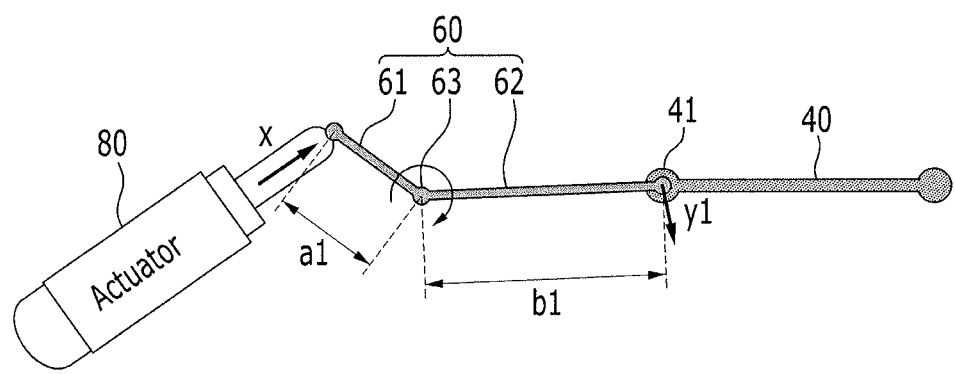
FIG. 4 is an enlarged view of a toe control unit of an active geometry control suspension according to an exemplary embodiment of the present invention.

Referring to FIG. 4, the toe control lever 60 may include a first toe control lever 61 having one side connected to the actuator 80 as a third lever and a second toe control lever 62 having one side connected to the assist link 40 as a fourth lever, the other side of the first toe control lever 61 and the other side of the second toe control lever 62 are connected to each other to form an obtuse angle, forming a connection portion 63, and the connection portion 63 may form a hinge portion of the first and second toe control levers 61 and 62 as shown by an arrow.

Accordingly, if the actuator 80 extends in a stroke X shown by the arrow, the first and second toe control levers 61 and 62 are rotated in a clockwise direction based on the connection portion 63, and one side of the second toe control lever 62 and a connection portion 41 (or a hard point HP) of the assist link 40 may be moved downwards by y1.

Figure 5:
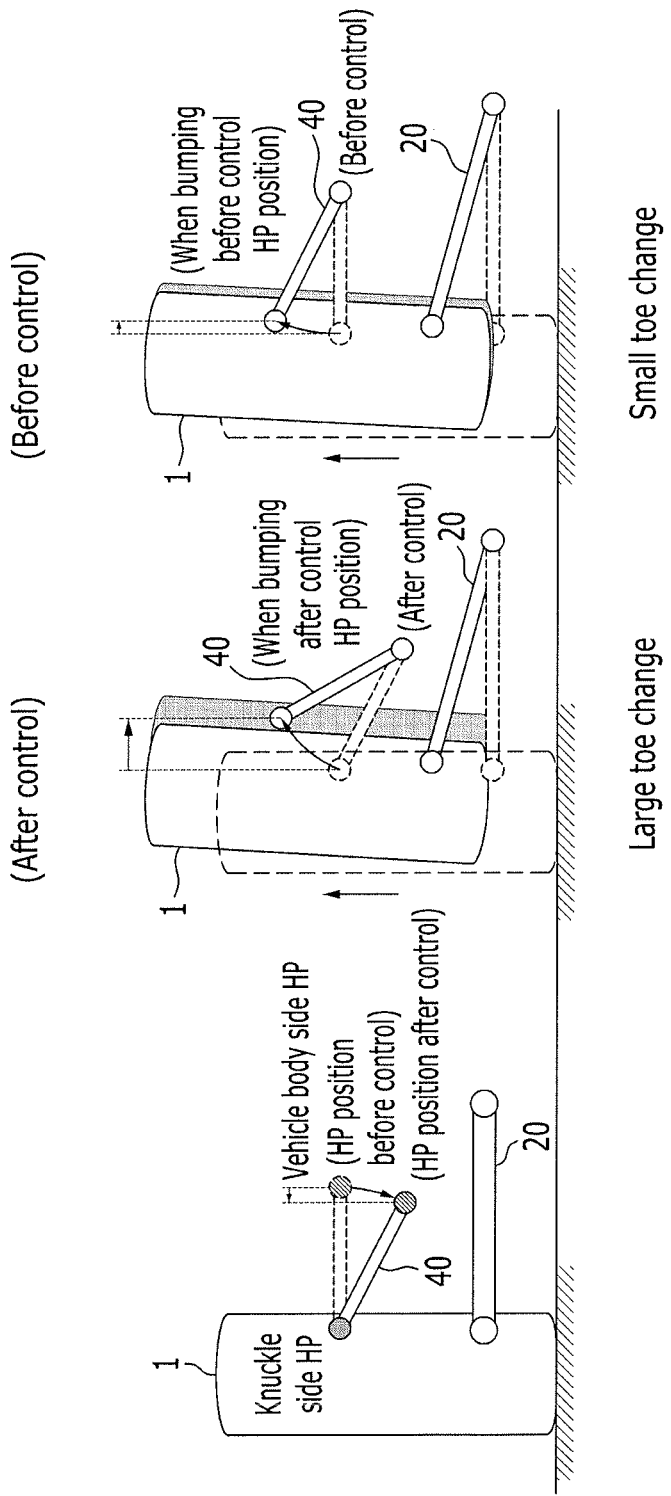
FIG. 5 is a diagram for explaining controlling a toe of a wheel by use of an active geometry control suspension according to an exemplary embodiment of the present invention.
Figure 6:
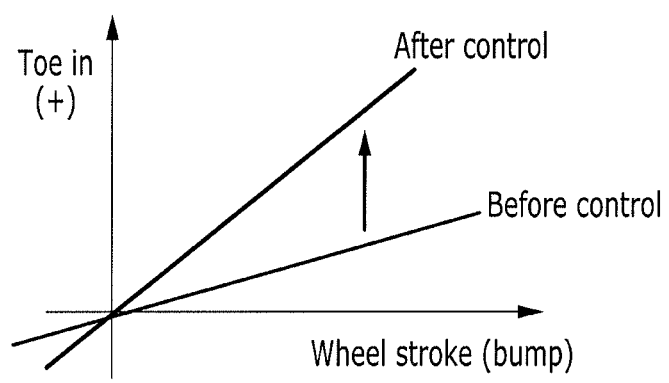
FIG. 6 is a bump-toe characteristic graph.

As above-described, in the state that the connection portion 41 of the vehicle body side of the assist link 40 moves downward, the wheel 1 is bumped, for example, if the vehicle turns, the wheel is bumped, and in the instant case, as a toe-in value of the bumped wheel is increased before the control as shown FIG. 5 and FIG. 6, turning stability is improved.

Figure 7:
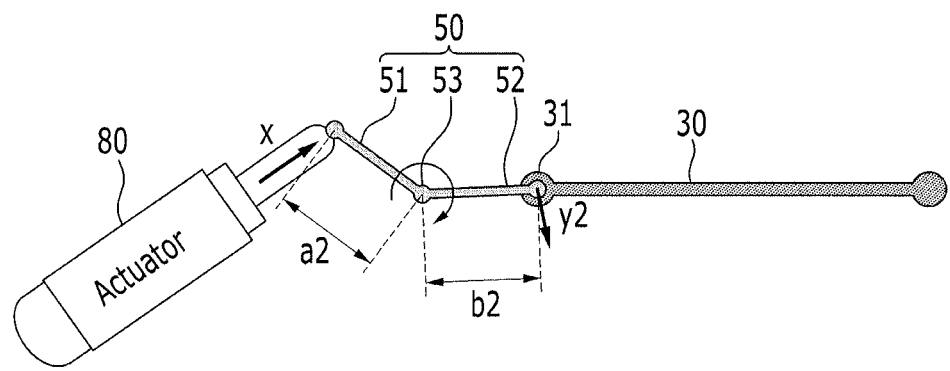
FIG. 7 is an enlarged view of a camber control unit according to an active geometry control suspension according to an exemplary embodiment of the present invention.

On the other hand, referring to FIG. 7, the camber control lever 50 may include a first camber control lever 51 having one side connected to the actuator 80 as a fifth lever and a second camber control lever 52 having one side connected to the upper link 30 as a sixth lever, the other side of the first camber control lever 51 and the other side of the second camber control lever 52 are connected to each other to form the obtuse angle, forming a connection portion 53, and the connection portion 53 may form the hinge portion of the first and second camber control levers 51 and 52.

Accordingly, if the actuator 80 extends in the stroke X as shown by the arrow, the first and second camber control levers 51 and 52 rotate in the clockwise direction based on the connection portion 53, and one side of the second camber control lever 52 and a connection portion 31 (also referred to as a hard point (HP)) of the upper link 30 moves downward by y2.

Figure 8:
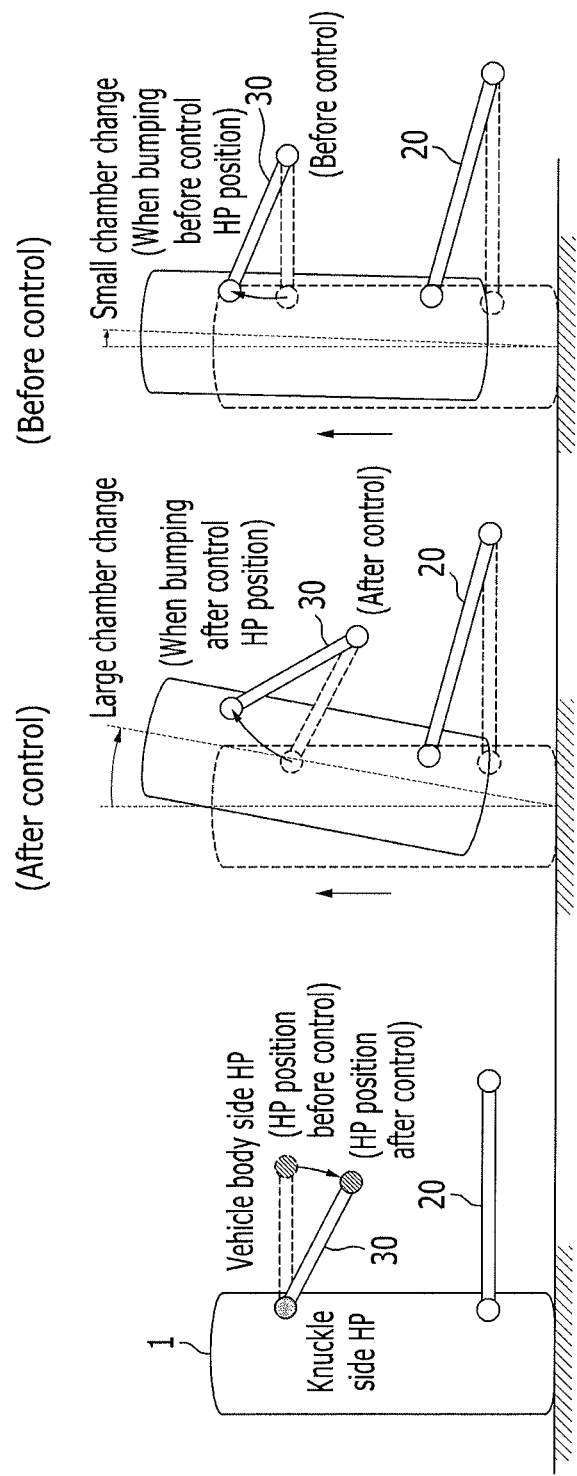
FIG. 8 is a diagram for explaining controlling a camber angle of a wheel by use of an active geometry control suspension according to an exemplary embodiment of the present invention.
Figure 9:
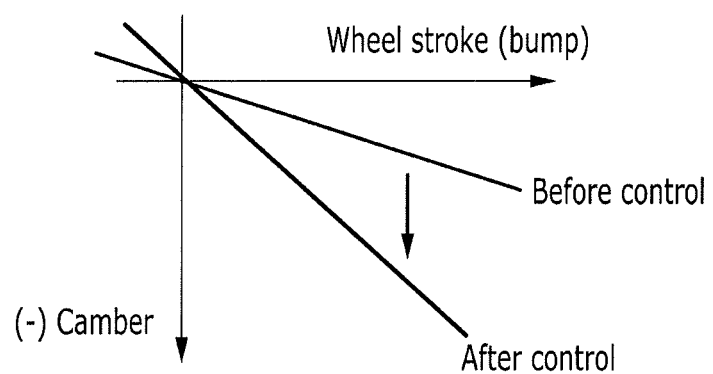
FIG. 9 is a bump-camber characteristic graph.

As described above, in the state that the connection portion 31 of the vehicle body side of the upper link 30 moves downward, if the wheel 1 turns and runs, the inside wheel of the turn is bumped, so that the (−) camber angle of the bumped wheel is increased before the control as shown in FIG. 8 and FIG. 9, such that the turning stability is improved.

On the other hand, to simultaneously adjust the toe-in and the camber angle by one actuator 80, a length ratio of the toe control lever 60 and the camber control lever 50 respectively connected to one actuator 80 through the connection lever 70 may be appropriately adjusted.

First, in the case of the toe control lever 60, referring to FIG. 4, when the length of the first toe control lever 61 and the second toe control lever 62 respectively are a1 and b1, if the actuator 80 moves by the stroke X, a movement amount of the connection portion 41 of the assist link 40 is represented by y1=x*a/b.

Accordingly, if the lengths a1 and b1 of the first toe control lever 61 and the second toe control lever 62 are appropriately adjusted, the movement amount of the HP of the assist link 40 and the value of the toe-in may be appropriately adjusted, and in the case of the camber control lever 50, if the ratio of the lengths a2 and b2 of the first camber control lever 51 and the second camber control lever 51 are appropriately adjusted, the (−) camber angle may be appropriately adjusted.

In the instant case, the lengths a1 and b1 of the first toe control lever 61 and the second toe control lever 62 are formed to be the same (referring to FIG. 1).

However, in the case of the multilink type of suspension, since the length of the upper link 30 is formed to be relatively longer than the length of the assist link 40, the movement amount of the HP of the upper link 30 may be greater than the movement amount of the HP of the assist link 40 to obtain the sufficient (−) camber control angle by the upper link 30. Accordingly, the length b2 of the second camber control lever 52 of the upper link 30 must be formed to be shorter than the length b1 of the second toe control lever 62 of the assist link 40.

Figure 10:
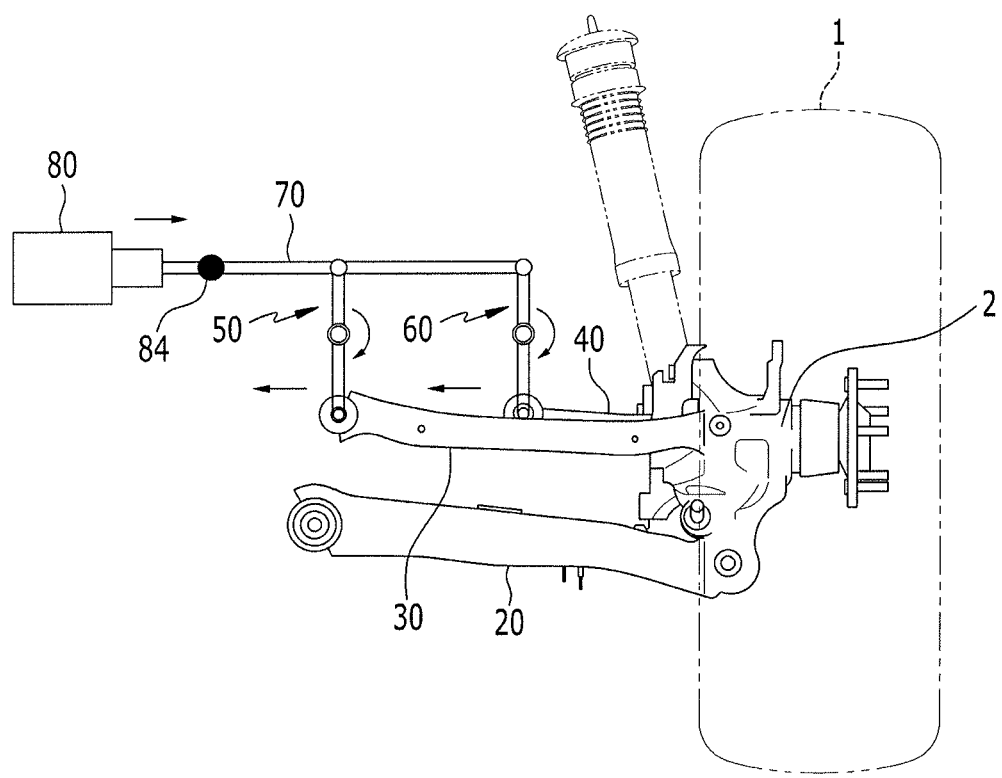
FIG. 10 is a front view of an active geometry control suspension according to various exemplary embodiments of the present invention.

On the other hand, as shown in FIG. 10, one side of the connection lever 70 is not only connected to the actuator 80 through the joint 84, but also the other side is disposed to extend along the width direction of the vehicle, one side of each of the toe control lever 60 and the camber control lever 50 may be connected to the connection lever 70, and each of the other sides of the toe control lever 60 and the camber control lever 50 may be connected to the assist link 40 and the upper link 30.

Accordingly, if the connection lever 70 moves outward in the width direction of the vehicle by the operation of the actuator 80, while the toe control lever 60 and the camber control levers 50 are rotated in the clockwise based on the hinge point thereof, the assist link 40 and the HP of the upper link 40 move inward in the width direction of the vehicle, the initial camber angle and toe in of the wheel may be easily adjusted.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An active geometry control suspension comprising:
   a first link having a first side connected to a wheel carrier engaged to a wheel and a second side extending along a width direction of a vehicle;
   a second link having a first side connected to the wheel carrier and a second side extending in the width direction of the vehicle;
   a first lever having a first side connected to the second side of the first link;
   a second lever having a first side connected to the second side of the second link;
   a connection lever connecting the second side of the first lever and the second side of the second lever; and
   an actuator connected to the connection lever.

2. The active geometry control suspension of claim 1, wherein the first link is connected to an upper portion of the wheel carrier.

3. The active geometry control suspension of claim 1, wherein the first lever is configured for adjusting a camber of the wheel.

4. The active geometry control suspension of claim 1, wherein the second lever is configured for adjusting a toe of the wheel.

5. The active geometry control suspension of claim 1, further including:
   a third link having a first side connected to the wheel carrier and a second side extending in the width direction of the vehicle and mounted with a suspension spring.

6. The active geometry control suspension of claim 5, wherein the first link is disposed higher than the third link in a height direction of the vehicle.

7. The active geometry control suspension of claim 1, wherein the actuator includes a motor coupled to a screw moving back and forth thereof by the motor, and wherein the screw is connected to the connection lever.

8. The active geometry control suspension of claim 1, wherein the second lever includes:
   a third lever having a first side connected to the connection lever; and
   a fourth lever having a first side connected to the second link.

9. The active geometry control suspension of claim 8, wherein a second side of the third lever and a second side of the fourth lever are connected to each other to form an obtuse angle therebetween, forming a first connection portion, and
   wherein the first connection portion forms a hinge portion of the third and fourth levers.

10. The active geometry control suspension of claim 8, wherein a length of the first link is formed to be longer than a length of the second link; and
    wherein a length of the third lever is formed to be shorter than a length of the fourth lever.

11. The active geometry control suspension of claim 8, wherein the first lever includes:

a fifth lever having a first side connected to the connection lever; and a sixth lever having a first side connected to the first link.

12. The active geometry control suspension of claim 11, wherein a second side of the fifth lever and a second side of the sixth lever are connected to each other to form an obtuse angle therebetween, forming a second connection portion, and wherein the second connection portion forms a hinge portion of the fifth and sixth levers.

13. The active geometry control suspension of claim 11, wherein a length of the first link is formed to be longer than a length of the second link, and wherein a length of the sixth lever is formed to be shorter than a length of the fourth lever.

14. The active geometry control suspension of claim 11, wherein a length of the fifth lever is formed to be longer than a length of the sixth lever.

15. The active geometry control suspension of claim 11, wherein lengths of the third lever and the fifth lever are a same.

16. The active geometry control suspension of claim 1, wherein a first side of the connection lever is connected to the actuator, and wherein a second side of the connection lever is mounted to extend in the width direction of the vehicle.

17. The active geometry control suspension of claim 1, wherein the connection lever and the actuator are connected by a joint.

\* \* \* \* \*